United States Patent
Edelin et al.

(10) Patent No.: US 11,555,472 B2
(45) Date of Patent: Jan. 17, 2023

(54) SILOXANE MITIGATION IN MACHINE SYSTEM HAVING BLOWER FOR PRESSURE DROP COMPENSATION

(71) Applicant: Caterpillar Inc., Peoria, IL (US)

(72) Inventors: John Bradley Edelin, Clayton, NC (US); Daniel Atlas Cockman, II, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 481 days.

(21) Appl. No.: 16/724,964

(22) Filed: Dec. 23, 2019

(65) Prior Publication Data
US 2021/0190017 A1 Jun. 24, 2021

(51) Int. Cl.
*F02M 35/02* (2006.01)
*B01D 53/04* (2006.01)
*B60K 13/02* (2006.01)
*F01N 11/00* (2006.01)
(Continued)

(52) U.S. Cl.
CPC ..... *F02M 35/0218* (2013.01); *B01D 53/0415* (2013.01); *B60K 13/02* (2013.01); *F01N 11/002* (2013.01); *F02M 35/0205* (2013.01); *F02M 35/084* (2013.01); *F02M 35/10144* (2013.01);
(Continued)

(58) Field of Classification Search
CPC .......... F02M 35/0218; F02M 35/0205; F02M 35/084; F02M 35/10144; F02M 35/10209; F02M 35/0216; F02M 35/042; F02M 35/048; F02M 35/08; B01D 53/0415; B01D 2257/55; B01D 2259/4566; B01D 46/0009; B01D 46/0036; B01D 46/12; B01D 46/446; B01D 46/58; B01D 46/645; B60K 13/02; F01N 11/002
See application file for complete search history.

(56) References Cited

U.S. PATENT DOCUMENTS

| 4,259,096 A | 3/1981 | Nakamura et al. |
| 5,079,921 A | 1/1992 | McCandless et al. |
| 5,261,271 A | 11/1993 | Bihn et al. |

(Continued)

FOREIGN PATENT DOCUMENTS

| CN | 203551285 U | 4/2014 |
| CN | 203627028 U | 6/2014 |

(Continued)

OTHER PUBLICATIONS

Written Opinion and International Search Report for International Patent Appln. No. PCT/US2020/061746, dated Feb. 3, 2021 (13 pgs).

*Primary Examiner* — Jacob M Amick
*Assistant Examiner* — Charles J Brauch
(74) *Attorney, Agent, or Firm* — Brannon Sowers & Cracraft PC (57) ABSTRACT

A siloxane mitigation system for a machine system having an internal combustion engine includes a siloxane trap having a plurality of adsorbent cartridges fluidly in parallel with one another, an air precleaner fluidly connected to a trap housing inlet, and a blower structured to blow intake air to the siloxane trap to compensate for a pressure drop across the siloxane trap. A trap performance sensor of the siloxane mitigation system is structured for monitoring an exhaust pressure to indicate performance degradation of the siloxane mitigation system and activate an operator-perceptible alert.

16 Claims, 4 Drawing Sheets

(51) Int. Cl.
  *F02M 35/08* (2006.01)
  *F02M 35/10* (2006.01)

(52) U.S. Cl.
  CPC ... *F02M 35/10209* (2013.01); *B01D 2257/55* (2013.01); *B01D 2259/4566* (2013.01)

(56) References Cited

U.S. PATENT DOCUMENTS

| | | |
|---|---|---|
| 5,373,733 A | 12/1994 | Fuchs et al. |
| 6,418,719 B2 | 7/2002 | Terry et al. |
| 6,708,104 B2 | 3/2004 | Avery, Jr. et al. |
| 7,393,381 B2 | 7/2008 | Tower et al. |
| 8,137,443 B2 | 3/2012 | Aono et al. |
| 8,435,329 B2 | 5/2013 | Hayward |
| 9,587,538 B2 | 3/2017 | Clayton, Jr. et al. |
| 9,605,626 B2 | 3/2017 | Harris et al. |
| 9,611,819 B2 | 4/2017 | Yi |
| 9,732,710 B2 | 8/2017 | Bellis et al. |
| 9,803,598 B2 | 10/2017 | Clayton |
| 10,100,790 B1 | 10/2018 | Xiao et al. |
| 2004/0050252 A1 | 3/2004 | Wernholm et al. |
| 2012/0048631 A1 | 3/2012 | Shatters et al. |
| 2012/0179354 A1 | 7/2012 | Hagen |
| 2012/0317974 A1 | 12/2012 | Rollinger |
| 2013/0025454 A1* | 1/2013 | Moredock ......... B01D 46/2403 55/502 |
| 2013/0013166 A1 | 12/2013 | Petrovic et al. |
| 2017/0114758 A1 | 4/2017 | Bittner |
| 2017/0175689 A1* | 6/2017 | Clayton ........... F02M 35/10157 |
| 2018/0073474 A1* | 3/2018 | Clayton, Jr. ..... F02M 35/02491 |

FOREIGN PATENT DOCUMENTS

| | | | | |
|---|---|---|---|---|
| CN | 104775949 A | | 7/2015 | |
| CN | 108151814 A | | 6/2018 | |
| JP | H05026027 A | * | 7/1991 | |
| JP | 2002060767 A | | 2/2002 | |
| JP | 2007211605 A | | 8/2007 | |
| JP | 2014083511 A | | 5/2014 | |
| JP | 2018080680 A | | 5/2018 | |
| WO | WO-2015062723 A1 | * | 5/2015 | ............. B01D 39/02 |

* cited by examiner

SILOXANE MITIGATION IN MACHINE SYSTEM HAVING BLOWER FOR PRESSURE DROP COMPENSATION

TECHNICAL FIELD

The present disclosure relates generally to siloxane mitigation in a machine system, and more particularly to a siloxane mitigation system where a powered precleaner compensates for a pressure drop across a siloxane trap feeding intake air to an internal combustion engine.

BACKGROUND

Internal combustion engines generally operate to combust a mixture of a fuel and air, producing a rapid rise in pressure and temperature within engine cylinders to drive pistons coupled with a rotatable crankshaft. Engine intake systems commonly include various apparatus for removing potential contaminants from a flow of intake air. Certain contaminants can pass through an internal combustion engine system with little effect. Others, including relatively larger particles, combustible gases, and various other materials encountered in an operating environment can have deleterious effects on engine performance or even lead to failure.

In certain environments, notably waste handling and landfill environments, siloxane contaminants may be airborne and carried into an engine intake system. Siloxanes mixed into engine intake air can undergo reactions during the combustion process and produce silicates that can become trapped within the engine or downstream exhaust components, and ultimately risk severe performance degradation. Silicates may adhere to surfaces inside the engine and interfere with motion of components, plug aftertreatment components and produce increased backpressure, or cause other problems. At minimum, machines operating in environments where high concentrations of airborne siloxanes are encountered may require service at a greater frequency than desired. U.S. Pat. No. 9,803,598 to Clayton is directed to an air intake system for an engine. The air intake system includes multiple air intake conduits, with one of the air intake conduits having a siloxane adsorber and a second intake conduit providing air to the engine while the siloxane adsorber is regenerated.

SUMMARY OF THE INVENTION

In one aspect, a machine system includes an internal combustion engine system having an engine, and each of an exhaust conduit and an intake conduit fluidly connected to the engine. The machine system further includes a siloxane mitigation system including a siloxane trap, an air precleaner, and a blower. The siloxane trap is positioned in the intake conduit and includes a trap housing and a plurality of adsorbent cartridges positioned fluidly in parallel with one another in the trap housing and producing an intake air pressure drop from a trap housing inlet to a trap housing outlet. The air precleaner is positioned upstream of the siloxane trap in the intake conduit and includes a precleaner housing having a debris-ejection port. The blower is positioned upstream of the siloxane trap and structured to blow intake air through the intake conduit to compensate for the intake pressure drop from the trap housing inlet to the trap housing outlet.

In another aspect, a method of operating a machine system includes feeding intake air through a siloxane trap in an intake conduit fluidly connected to an engine in the machine system, and trapping siloxanes in the intake air in a plurality of adsorbent cartridges positioned fluidly in parallel with one another in the siloxane trap. The method further includes protecting a siloxane adsorbent media in the plurality of adsorbent cartridges from contamination at least in part by precleaning the intake air in an air precleaner positioned upstream of the siloxane trap in the intake conduit. The method further includes reducing a pressure of the intake air based on the feeding of the intake air through the siloxane trap, increasing a pressure of the intake air upstream of the siloxane trap so as to compensate for the reduction in pressure, and feeding the intake air from the siloxane trap through the intake conduit to the engine.

In still another aspect, a siloxane mitigation system for a machine system includes a siloxane trap including a trap housing having a trap housing inlet, a trap housing outlet, and a plurality of adsorbent cartridges positioned fluidly in parallel between the trap housing inlet and the trap housing outlet. The siloxane mitigation system further includes an air precleaner fluidly connected to the trap housing inlet and including a precleaner housing having a debris-ejection port. The siloxane mitigation system still further includes a blower fluidly positioned upstream of the trap housing inlet and structured to blow intake air to the siloxane trap to compensate for a pressure drop from the trap housing inlet to the trap housing outlet. The siloxane mitigation system further includes an intake conduit formed in part by each of the siloxane trap, the air precleaner, and the blower. The intake conduit includes an upstream segment extending from the siloxane trap to an intake air inlet, and a downstream segment extending from the siloxane trap to an intake air outlet structured to fluidly connect to an engine in the machine system.

DETAILED DESCRIPTION

Figure 1:
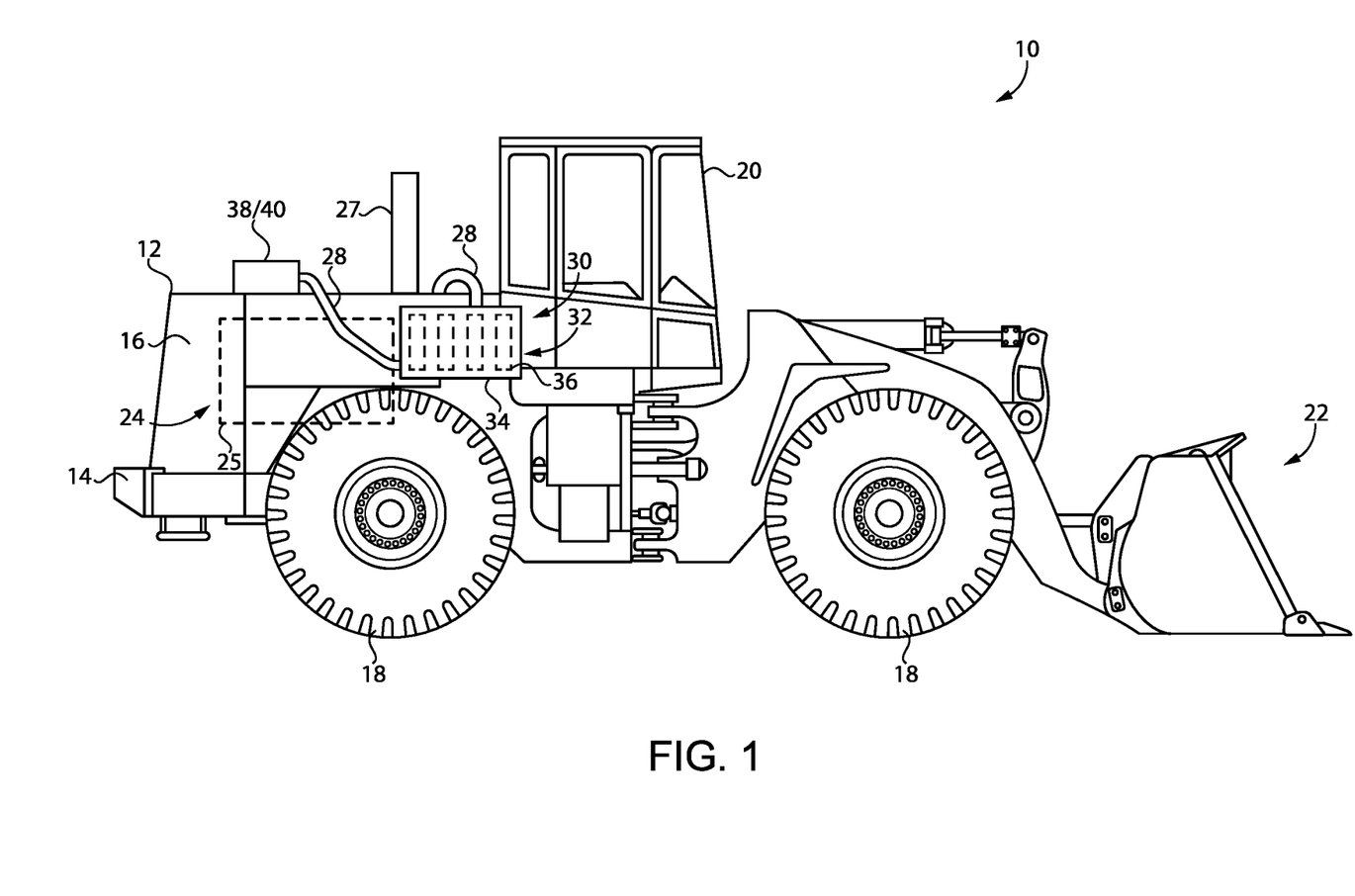
FIG. 1 is a side diagrammatic view of a machine system, according to one embodiment.

Referring to FIG. 1, there is shown a machine system according to one embodiment and including a machine 12 having a machine frame 14 and ground-engaging propulsion elements coupled to machine frame 12. A machine housing 16 is also supported upon machine frame 14 and forms an engine compartment where components of an internal combustion engine system 24, including an engine 25, are housed. Machine 12 is shown in the context of a wheel loader machine having an implement system 22, for example including a bucket, positioned at a front end of machine frame 14. An operator cab 20 is also supported upon machine frame 14 in a generally conventional manner. In other embodiments, machine 12 could be another mobile vehicular machine, such as a compactor, a backhoe, a track-type machine such a track-type tractor, or various others. Machine system 10 could also be a stationary machine, such as a genset. Internal combustion engine system 24 provides propulsive power for machine 12 and includes each of an exhaust conduit 27 and an intake conduit 28 fluidly connected to engine 25. Engine 25 can include a multi-cylinder compression-ignition diesel engine, but in other embodiments could be a gaseous fuel engine, a dual fuel engine, a spark-ignited gasoline engine, or potentially still another.

Machine system 10 is considered applicable to operating in certain environments where ambient air contains various siloxanes, for example, landfill environments and waste transfer stations. To this end, machine system 10 also includes a siloxane mitigation system 30, including a siloxane trap 32 having a trap housing 34 and a plurality of siloxane adsorbent cartridges 36 positioned fluidly in parallel with one another within trap housing 34. The term fluidly in parallel contrasts with fluidly in series. Siloxane mitigation system 30 further includes an air precleaner 38 and a blower 40, packaged together in the illustrated embodiment. It has been observed that difficulties may be encountered in achieving desired air flow rates in internal combustion engines where certain filtration requirements are to be satisfied, and internal combustion engine system 24, including siloxane mitigation system 30, is uniquely configured to ensure engine intake airflow is not unduly restricted during operation as further discussed herein.

Figure 2:
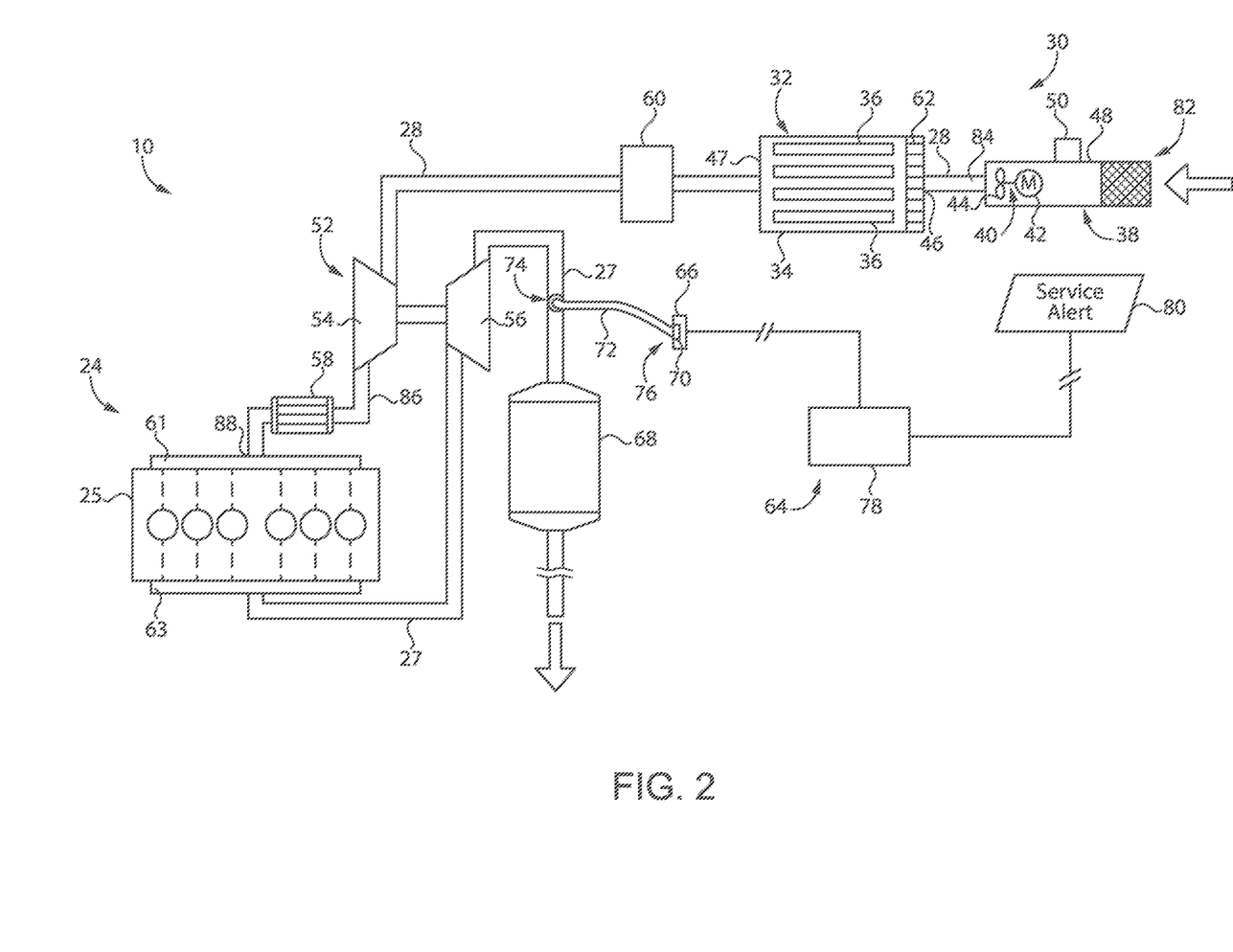
FIG. 2 is a schematic illustration of the machine system of FIG. 1.

Siloxane trap 32 is positioned in intake conduit 28 and structured such that a trap housing inlet 46 receives intake air, with the intake air being fed to a trap housing outlet 47 and producing an intake air pressure drop from trap housing inlet 46 to trap housing outlet 47. Air precleaner 38 is positioned upstream of siloxane trap 32 in intake conduit 28 and includes a precleaner housing 48 having a debris-ejection port 50. As noted above, air precleaner 38 and blower 40 may be integrated into a single unit. Intake conduit 28 may be understood as formed in part by each of siloxane trap 32, air precleaner 38, and blower 40. Blower 40 may include a motor 42, for example an electric motor, and a rotor such as a fan 44 positioned in precleaner housing 48. Air precleaner 38 could include a powered cyclonic air cleaner, for example, or still another type of powered precleaner. In still other instances, air precleaner 38 could be a passive device having internal geometry assisting in ejecting debris through debris-ejection port 50 in response to airflow through precleaner housing 48, with blower 40 positioned upstream of precleaner 38, or potentially even downstream of precleaner 38 in some embodiments. Blower 40, whether integrated with precleaner 38 or not, is positioned upstream of siloxane trap 32 and structured to blow intake air through intake conduit 28 to compensate for the intake air pressure drop from trap housing inlet 46 to trap housing outlet 47.

Other features of machine system 10, engine system 24, and siloxane mitigation system 30 are also shown in FIG. 2. Siloxane mitigation system 30 may further include a filter-diffuser 62 positioned in intake conduit 28 fluidly between adsorbent cartridges 36 and blower 40. Filter-diffuser 62 can filter particulates from intake air, as well as spreading and diffusing the flow to feed air to cartridges 36 substantially uniformly. An additional post-filter 60 may be positioned downstream of siloxane trap 32 to receive treated intake air from trap housing outlet 47. Post-filter 60 might include a filter medium relatively finer than a filter medium of filter-diffuser 62. Intake conduit 28 may further include an upstream segment 84 extending from siloxane trap 32 to an intake air inlet 82, and a downstream segment 86 extending from siloxane trap 32 to an intake air outlet 88 structured to fluidly connect to engine 25 in machine system 10. Precleaner 32 and blower 40 may be understood to be positioned fluidly within upstream segment 84. Post-filter 60, a compressor 54 of a turbocharger 52, as well as an aftercooler 58, may be understood to be positioned fluidly in downstream segment 86. Siloxane trap 32 could be understood to form a middle segment of intake conduit 28. Intake air outlet 88 feeds intake air having been precleaned in air precleaner 32, filtered of siloxanes in siloxane trap 32, post-filtered in post filter 60, compressed in compressor 54, and cooled in aftercooler 58 into an intake manifold 61 of engine 25.

Engine 25 also includes an exhaust manifold 63 fluidly connected to exhaust conduit 27. Exhaust from engine 25 can be fed through exhaust conduit 27 to a turbine 56 of turbocharger 52, and thenceforth to an aftertreatment element 68 positioned fluidly in exhaust conduit 27. Aftertreatment element 68 could include a diesel oxidation catalyst (DOC), a particulate filter (DPF), a selective catalytic reduction module (SCR), any of several combinations or permutations of these, or still another aftertreatment element.

As explained above, accumulation of silicates in an engine system, and notably in an exhaust system, can have deleterious effects on performance, potentially plugging the exhaust system by accumulating on catalyst surfaces, or upon other features, to the point that excessive exhaust backpressure is produced. Siloxane mitigation system 30 may be further equipped with apparatus for monitoring a performance of siloxane trap 32 indirectly, by monitoring a fluid pressure parameter in exhaust conduit 27. To this end, machine system 10, and siloxane mitigation system 30, further includes a trap performance sensor 66. Trap performance sensor 66 may be part of a control system 64 also including an electronic control unit 78. Trap performance sensor 66 may further include a pressure sensor having a sensor surface 70 exposed to exhaust in exhaust conduit 27 and structured to produce a trap performance signal indicative of silicate accumulation in aftertreatment device 68. The trap performance signal could be a voltage signal directly or indirectly indicative of an absolute exhaust pressure. Electronic control unit 78 can calculate exhaust backpressure, such as by comparing a signal value of trap performance signal to a reference value for a given set of engine conditions. Electronic control unit 78 could also be structured to discriminate between exhaust pressures produced by trapped particulates such as soot or ash, and accumulated silicates, such as by monitoring a fill state of a DPF. In a further practical implementation, siloxane mitigation system 30 may include a sensing conduit 72 having an inlet end 74 attached to exhaust conduit 27, and a second end 76 supported at a location spaced from exhaust conduit 27, for example spaced by one, two, or three feet or more. Trap performance sensor 66 may be supported at the location spaced from exhaust conduit 27 such that sensor surface 70 of pressure sensor 66 is exposed to an exhaust pressure of sensing conduit 72. Sensing conduit 72 can include a heat resistant material structured to tolerate the relatively high exhaust temperatures of at least several hundred degrees Celsius, and space sensor 66 away from surfaces of exhaust conduit 27. It can be noted that in the illustrated embodiment inlet end 74 of sensing conduit 72 is positioned fluidly between turbine 56 and aftertreatment element 68. Other strategies and/or sensing locations for directly or indirectly sensing exhaust pressure, in turn indicative of exhaust backpressure produced based on silicate accumulation, are within the scope of the present disclosure.

Control system 64 may further include an alert device 80 structured to output an operator-perceptible servicing alert based on the trap performance signal. Alert device 80 could include a light, such as a check engine light, positioned in operator cab 20 in some embodiments. In alternative embodiments alert 80 could include a different light or one located elsewhere, a graphic on a user interface, a sound producing device, a vibratory device, or still another alert device capable of alerting an operator that servicing is needed or a servicing need is anticipated. Electronic control module 78 could be structured to activate servicing alert 80 in different ways depending upon the trap performance signal. For example, where exhaust backpressure is at a first level, equal to or exceeding a first threshold, alert device 80 could be activated to inform an operator that service is needed soon. When the trap performance signal indicates an exhaust backpressure that is equal to or greater than a higher threshold, electronic control unit 78 could activate alert device 80 to indicate that servicing is needed immediately, or electronic control unit 78 could simply initiate engine shutdown procedures or initiate a limp home mode or the like. The servicing that might be undertaken could include servicing after treatment element 68, such as by swapping out catalyst bricks having accumulated silicates for new bricks. In other instances, a servicing action could include servicing siloxane trap 32 itself, by swapping out poorly functioning or nonfunctioning cartridges 36 for fresh cartridges to avoid further accumulation of silicates and any further reduction in performance.

Figure 3:
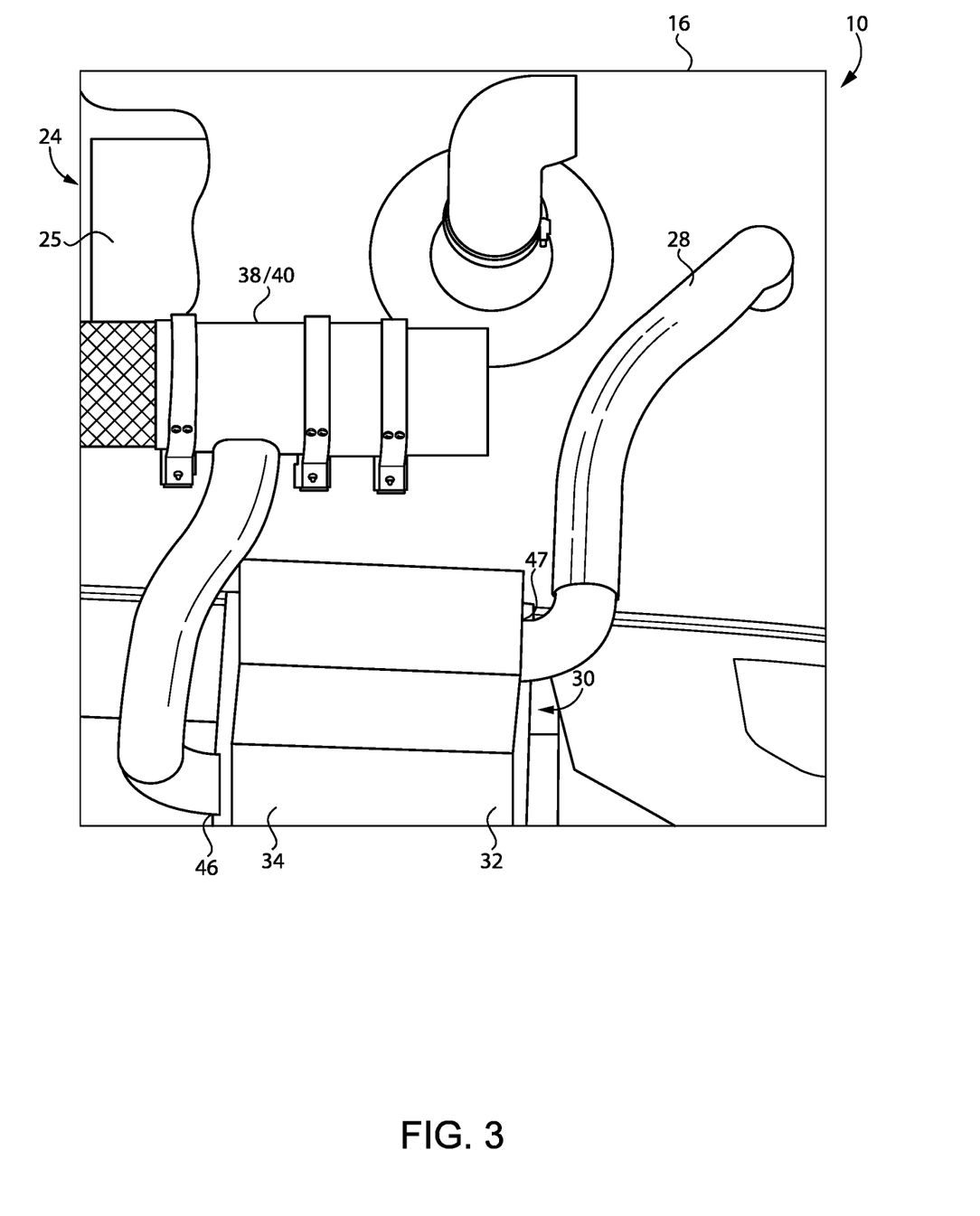
FIG. 3 is a diagrammatic view of a portion of the machine system of FIGS. 1-2.

Referring now to FIG. 3, there is shown a view of a portion of machine system 10 illustrating machine housing 16 with portions of engine system 24 housed therein, and portions of siloxane mitigation system 30 mounted thereon. It will be recalled that siloxane mitigation system 30 includes siloxane trap 32 with trap housing 32. Trap housing 32 may be positioned externally to machine housing 16, for example mounted next to or upon the side of machine housing 16 as shown. Precleaner 38 and blower 40, shown as an integrated unit, may be mounted on top of machine housing 16, to feed precleaned air to trap housing inlet 46, with the intake air treated in siloxane trap 32 and fed out of trap housing outlet 47 to continue on into the engine compartment formed by machine housing 16.

In other embodiments different mounting or packaging strategies could be used. For example, precleaner 38 could be mounted upon trap housing 34, or all, or substantially all, of the components of siloxane mitigation system 30 could be positioned inside machine housing 16. Moreover, locations of trap housing inlet 46 and trap housing outlet 47 could differ from those shown. Finally, it will be understood in view especially of FIG. 3, that intake air follows a relatively tortuous path between precleaner 38 and engine 25, potentially encountering multiple components, or features of intake conduit 28, that reduce intake air pressure. It is generally desirable to structure siloxane trap 32 such that intake air has sufficient residence time for siloxanes to be adsorbed. As discussed herein, however, blower 40 assists in compensating for a pressure drop from trap housing inlet to trap housing outlet 47, and pressure drops produced elsewhere.

Figure 4:
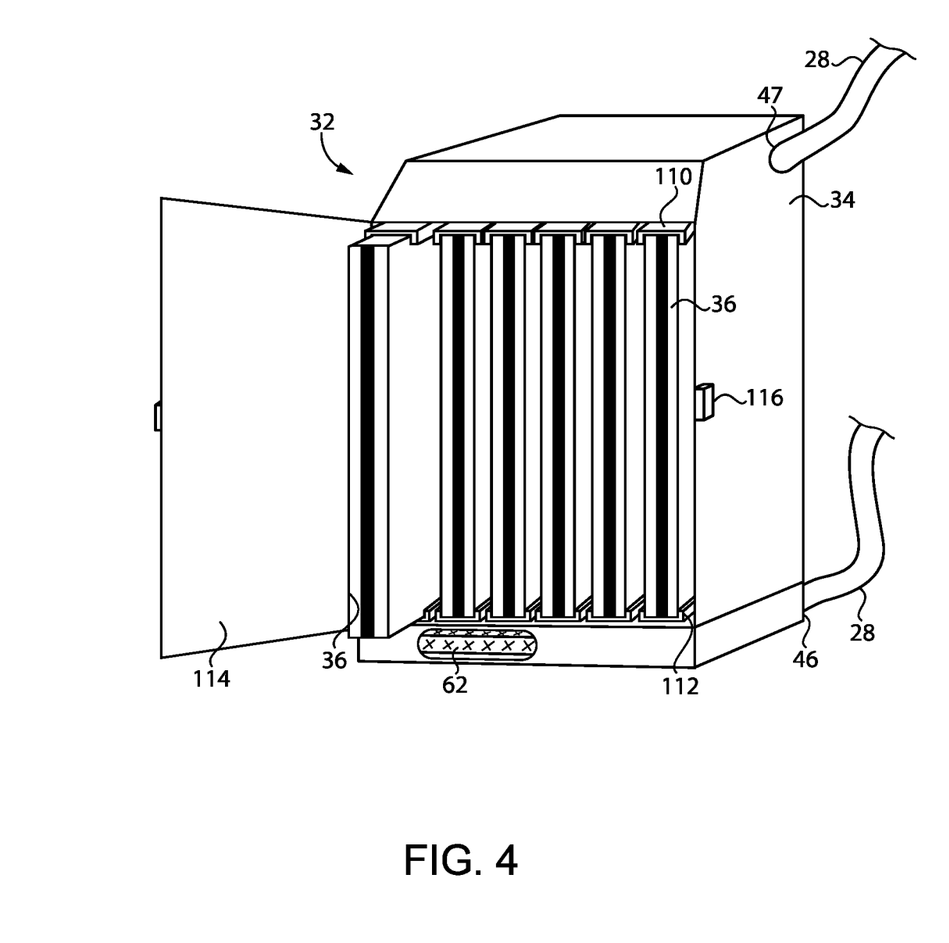
FIG. 4 is a diagrammatic view, in perspective, of a siloxane trap, according to one embodiment.
Figure 5:
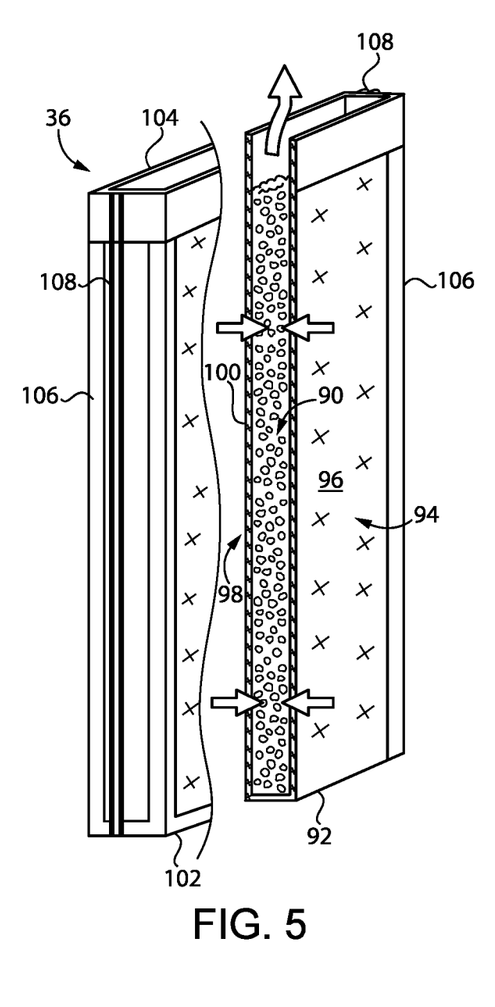
FIG. 5 is a partially open diagrammatic perspective view of an adsorbent cartridge for use in the siloxane trap of FIG. 4.

Referring also now to FIGS. 4 and 5, there are shown additional details of siloxane trap 32. In FIG. 4, filter-diffuser 62 is shown positioned in trap housing 34 and receives intake air by way of intake conduit 28. The plurality of siloxane adsorbent cartridges 36 are positioned fluidly in parallel with one another as shown, and can accommodate a flow of intake air having passed through filter-diffuser 62 and then vertically upward through and between cartridges 36 toward trap housing outlet 47. Cartridges 36 may be releasably supported in trap housing 34, and positioned and mounted by way of a top bracket 110 and a bottom bracket 112, for instance. One of cartridges 36 is shown as it might appear having been partially slid out of trap housing 34. Trap housing 34 may further be understood to have a box configuration with a rectangular footprint upon one or more sides. Trap housing 34 further has an access door 114 movable between an open configuration (as shown), and a closed configuration. A latch 116 is provided for securing access door 114.

Each of cartridges 36 may further include a siloxane adsorbent media 90 and a cartridge frame 92 releasably supported in trap housing 34. The siloxane adsorbent media 90 may include a granulated media, such as granules of activated carbon. Wood-based activated charcoal and/or coal-based activated charcoal might be used. Each of adsorbent cartridges 36 further includes a first incoming air side 94 formed by a first perforated sidewall 96, and a second incoming air side 98 positioned opposite to the first incoming air side 94 and formed by a second perforated sidewall 100. First perforated side wall 96 and second perforated side wall 100 are supported by cartridge frame 92. As depicted in FIG. 5, it will be understood that incoming air flow impinges upon the opposite first and second incoming air sides 94 and 98, and is fed through media 90 such that flows of intake air having been treated for removal of siloxanes are recombined prior to reaching trap housing outlet 47. Each cartridge frame 92 may further have a rectangular configuration and includes a leading peripheral edge 102 oriented toward an incoming flow of air, a trailing peripheral edge 104, and longitudinal peripheral edges 106. Leading peripheral edge 102 may be closed to urge air upward between and ultimately into cartridges 36. Trailing peripheral edge 104 may be open. Accordingly, trap housing 34 may be understood to form a plenum that combines flows of intake air from each of cartridges 36. Siloxane mitigation system 30 may further include air seals 108, for instance non-metallic and elastically deformable air seals, fluidly sealing between longitudinal peripheral edges 106 and trap housing 34. Air seals 108 could be attached to each cartridge frame 92, and could be included on leading peripheral edge 102 and or trailing peripheral edge depending upon a configuration and mounting or securing arrangement of cartridges 36. Air seals 108 may fluidly seal between access door 114 and cartridge frames 92 when access door 114 is in the closed configuration. Each of first perforated side wall 96 and second perforated side wall 100 may be formed by a screen, with the granulated media 90 trapped between the screens in the respective cartridge 36.

INDUSTRIAL APPLICABILITY

Referring to the drawings generally, engine 25 may be operated to combust fuel and air, driving a crankshaft by way of pistons in a generally conventional manner. The combustion of fuel and air produces exhaust to rotate turbine 56, which in turn rotates compressor 54. Suction produced by piston reciprocation and by rotation of compressor 54 can draw intake air into intake air inlet 82. Operation of blower 40 results in expelling of particulates or other debris out of debris-ejection port 50, with blower 40 blowing the precleaned intake air through intake conduit 28 to siloxane trap 32.

As discussed herein, siloxanes in the intake air are trapped in cartridges 36 by adsorption to media 90 as intake air is fed through siloxane trap 32. Expelling of particulates protects media 90 in cartridges 36 from contamination by precleaning the intake air. As also discussed herein, a pressure of intake air is reduced based on the feeding of the intake air through siloxane trap 32. Operation of precleaner 38, however, can provide a positive pressure increase upstream of siloxane trap 32 so as to compensate for the reduction in pressure. As engine 25 is increased in engine speed, compressor 54 may eventually increase in speed to a point at which precleaner 38 and blower 40 no longer provide a positive pressure increase, however, at higher engine speeds the pressure drops across siloxane trap 32 and other system components are typically better tolerated.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. A machine system comprising:
   an internal combustion engine system including an engine, and each of an exhaust conduit and an intake conduit fluidly connected to the engine;
   a siloxane mitigation system including a siloxane trap, an air precleaner, and a blower;
   the siloxane trap being positioned in the intake conduit and including a trap housing and a plurality of adsorbent cartridges positioned fluidly in parallel with one another in the trap housing and producing an intake air pressure drop from a trap housing inlet to a trap housing outlet;
   the air precleaner being positioned upstream of the siloxane trap in the intake conduit and including a precleaner housing having a debris-ejection port;
   the blower being positioned upstream of the siloxane trap and structured to blow intake air through the intake conduit to compensate for the intake air pressure drop from the trap housing inlet to the trap housing outlet;
   a trap performance sensor exposed to exhaust in the exhaust conduit and structured to produce a trap performance signal indicative of silicate accumulation in an aftertreatment device;
   wherein the trap performance sensor includes a pressure sensor, and further comprising an alert device structured to produce an operator-perceptible servicing alert based on the trap performance signal; and
   a sensing conduit having an inlet end attached to the exhaust conduit, and a second end supported at a location spaced from the exhaust conduit, and wherein the pressure sensor is exposed to an exhaust pressure of the sensing conduit at the second end.

2. The machine system of claim 1 further comprising:
   a frame;
   ground-engaging propulsion elements coupled to the frame;
   a machine housing including an engine compartment; and
   the trap housing is positioned externally to the machine housing.

3. The machine system of claim 2 wherein the blower is integrated with the air precleaner and includes a motor, and a fan positioned in the air precleaner housing, and the precleaner housing is mounted to the machine housing.

4. The machine system of claim 1 wherein the siloxane mitigation system further includes a filter-diffuser positioned in the intake conduit fluidly between the plurality of adsorbent cartridges and the blower.

5. The machine system of claim 1 wherein each of the plurality of adsorbent cartridges includes a siloxane adsorbent media and a cartridge frame releasably supported in the trap housing.

6. The machine system of claim 5 wherein the plurality of adsorbent cartridges each include a first incoming air side formed by a first perforated side wall, and a second incoming air side positioned opposite to the first incoming air side and formed by a second perforated side wall.

7. The machine system of claim 6 wherein each of the cartridge frames has a rectangular configuration and includes a leading peripheral edge, a trailing peripheral edge, and longitudinal peripheral edges, and the siloxane mitigation system further includes air seals fluidly sealing between the longitudinal peripheral edges and the trap housing.

8. The machine system of claim 7 wherein the trap housing has a box configuration including an access door movable between an open configuration, and a closed configuration, and wherein the air seals include air seals fluidly sealing between the access door and the cartridge frames when the access door is in the closed configuration.

9. The machine system of claim 6 wherein the first perforated side wall and the second perforated side wall are each formed by a screen, and the siloxane adsorbent media includes granules trapped between the screens in the respective cartridge.

10. A method of operating a machine system comprising:
    feeding intake air through a siloxane trap in an intake conduit fluidly connected to an engine in the machine system;
    trapping siloxanes in the intake air in a plurality of adsorbent cartridges positioned fluidly in parallel with one another in the siloxane trap;
    protecting a siloxane adsorbent media in the plurality of adsorbent cartridges from contamination at least in part by precleaning the intake air in an air precleaner positioned upstream of the siloxane trap in the intake conduit;
    reducing a pressure of the intake air based on the feeding of the intake air through the siloxane trap;
    increasing a pressure of the intake air upstream of the siloxane trap so as to compensate for the reduction in pressure;
    feeding the intake air from the siloxane trap through the intake conduit to the engine;
    feeding exhaust from the engine through an exhaust conduit to an aftertreatment device;
    sensing a pressure of exhaust in the exhaust conduit; and
    producing a siloxane trap performance signal based on the sensed pressure of the exhaust.

11. The method of claim 10 wherein:
    the precleaning of the intake air includes expelling debris removed from the intake air with the air precleaner; and
    the increasing of the pressure of the intake air includes increasing the pressure of the intake air by blowing the precleaned intake air into the siloxane trap using a blower of the air precleaner.

12. The method of claim 10 wherein:
the feeding of the intake air through the siloxane trap further includes impinging the intake air upon opposite incoming air sides formed by perforated side walls of each of the cartridges; and
the trapping of siloxanes in the intake air further includes trapping the siloxanes in a siloxane adsorbent media trapped between the perforated side walls of each of the cartridges.

13. The method of claim 10 further comprising outputting an operator-perceptible servicing alert based on the siloxane trap performance signal.

14. A siloxane mitigation system for a machine system comprising:
a siloxane trap including a trap housing having a trap housing inlet, a trap housing outlet, and a plurality of adsorbent cartridges positioned fluidly in parallel between the trap housing inlet and the trap housing outlet;
an air precleaner fluidly connected to the trap housing inlet and including a precleaner housing having a debris-ejection port;
a blower positioned upstream of the trap housing inlet and structured to blow intake air to the siloxane trap to compensate for a pressure drop from the trap housing inlet to the trap housing outlet;
an intake conduit formed in part by each of the siloxane trap, the air precleaner, and the blower, and including an upstream segment extending from the siloxane trap to an intake air inlet, and a downstream segment extending from the siloxane trap to an intake air outlet structured to fluidly connect to an engine in the machine system;
a trap performance pressure sensor structured to produce a siloxane trap performance signal that is indicative of silicate accumulation in an aftertreatment device for the engine; and
an alert device structured to output an operator-perceptible servicing alert based on the siloxane trap performance signal.

15. The siloxane mitigation system of claim 14 wherein:
the plurality of adsorbent cartridges each include a first incoming air side formed by a first perforated side wall, a second incoming air side positioned opposite to the first incoming air side and formed by a second perforated side wall, a cartridge frame supporting the first perforated side wall and the second perforated side wall, and adsorbent granules trapped between the first perforated side wall and the second perforated side wall; and
the siloxane trap further includes air seals fluidly sealing between the cartridge frames and the trap housing.

16. The siloxane mitigation system of claim 14 further comprising a sensing conduit having an exhaust inlet end, and a second end spaced from the exhaust inlet end, and wherein the trap performance pressure sensor is exposed to a fluid pressure of the sensing conduit at the second end.

* * * * *